US012573699B2

(12) United States Patent
Park et al.

(10) Patent No.: US 12,573,699 B2
(45) Date of Patent: Mar. 10, 2026

(54) BATTERY MODULE AND METHOD FOR MANUFACTURING THE SAME

(71) Applicant: LG ENERGY SOLUTION, LTD., Seoul (KR)

(72) Inventors: Subin Park, Daejeon (KR); Junyeob Seong, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 651 days.

(21) Appl. No.: 17/760,860

(22) PCT Filed: Feb. 4, 2021

(86) PCT No.: PCT/KR2021/001489
§ 371 (c)(1),
(2) Date: Mar. 16, 2022

(87) PCT Pub. No.: WO2021/177607
PCT Pub. Date: Sep. 10, 2021

(65) Prior Publication Data
US 2022/0344758 A1    Oct. 27, 2022

(30) Foreign Application Priority Data

Mar. 6, 2020    (KR) ........................ 10-2020-0028575

(51) Int. Cl.
*H01M 50/242*        (2021.01)
*H01M 50/238*        (2021.01)
(52) U.S. Cl.
CPC ....... *H01M 50/242* (2021.01); *H01M 50/238* (2021.01)

(58) Field of Classification Search
None
See application file for complete search history.

(56) References Cited

U.S. PATENT DOCUMENTS 4,554,221 A * 11/1985 Schmid .............. H01M 50/213
429/178
2010/0275619 A1    11/2010 Koetting et al.
(Continued)

FOREIGN PATENT DOCUMENTS

CN        106450072 A        2/2017
CN        207038588 U        2/2018
(Continued)

OTHER PUBLICATIONS

Extended European Search Report for European Application No. 21764039.0, dated Mar. 28, 2023.
(Continued)

*Primary Examiner* — Alix E Eggerding
(74) *Attorney, Agent, or Firm* — Birch, Stewart, Kolasch & Birch, LLP

(57) ABSTRACT

A battery module includes a battery cell stack in which a plurality of battery cells are stacked, a first frame which is formed of a lower surface and left and right surfaces to cover a lower surface and left and right surfaces of the battery cell stack, and a second frame of which an upper surface, and front, rear, left and right surfaces are integrally formed to cover an upper surface and front and rear surfaces of the battery cell stack and the left and right surfaces of the first frame, and the left and right surfaces of the first frame are formed of an elastic member curved in a direction in which the battery cell stack is located.

15 Claims, 10 Drawing Sheets

(56)  References Cited

U.S. PATENT DOCUMENTS

| | | | |
|---|---|---|---|
| 2012/0045686 A1* | 2/2012 | Jung | H01M 50/264 |
| | | | 429/159 |
| 2013/0108909 A1* | 5/2013 | Matsuo | H01M 50/211 |
| | | | 429/100 |
| 2014/0038029 A1* | 2/2014 | Thurmeier | B60L 58/21 |
| | | | 429/156 |
| 2014/0113171 A1 | 4/2014 | Schaefer | |
| 2016/0133890 A1* | 5/2016 | Lee | H01M 50/503 |
| | | | 429/151 |
| 2017/0047562 A1* | 2/2017 | Ogawa | H01M 10/0431 |
| 2017/0144566 A1 | 5/2017 | Aschwer et al. | |
| 2018/0175343 A1 | 6/2018 | Choi et al. | |
| 2018/0331338 A1 | 11/2018 | Roderus et al. | |
| 2019/0267591 A1* | 8/2019 | Park | H01M 50/211 |
| 2020/0035980 A1 | 1/2020 | Hong et al. | |
| 2020/0108058 A1 | 4/2020 | Kim | |
| 2022/0302529 A1 | 9/2022 | Kim | |

FOREIGN PATENT DOCUMENTS

| | | | |
|---|---|---|---|
| CN | 108832053 A | 11/2018 | |
| CN | 108878691 A | 11/2018 | |
| DE | 10 2011 015 152 A1 | 9/2012 | |
| EP | 2 421 069 A1 | 2/2012 | |
| JP | 2009-182001 A | 8/2009 | |
| JP | 2011-23268 A | 2/2011 | |
| JP | 2013-246990 A | 12/2013 | |
| JP | 2014-78498 A | 5/2014 | |
| JP | 2015-11819 A | 1/2015 | |
| JP | 2020-501320 A | 1/2020 | |
| KR | 10-2010-0119497 A | 11/2010 | |
| KR | 10-2012-0017296 A | 2/2012 | |
| KR | 10-2017-0135597 A | 12/2017 | |
| KR | 10-2018-0113416 A | 10/2018 | |
| KR | 10-2019-0063809 A | 6/2019 | |
| KR | 10-2019-0090299 A | 8/2019 | |
| KR | 10-2019-0128812 A | 11/2019 | |
| KR | 10-2017-0030954 A | 12/2025 | |
| WO | WO201818664 | * | 4/2018 |
| WO | WO 2019/107734 A | 6/2019 | |

OTHER PUBLICATIONS

International Search Report (PCT/ISA/210) issued in PCT/KR2021/001489 mailed on Jun. 3, 2021.

* cited by examiner

[FIG. 1]
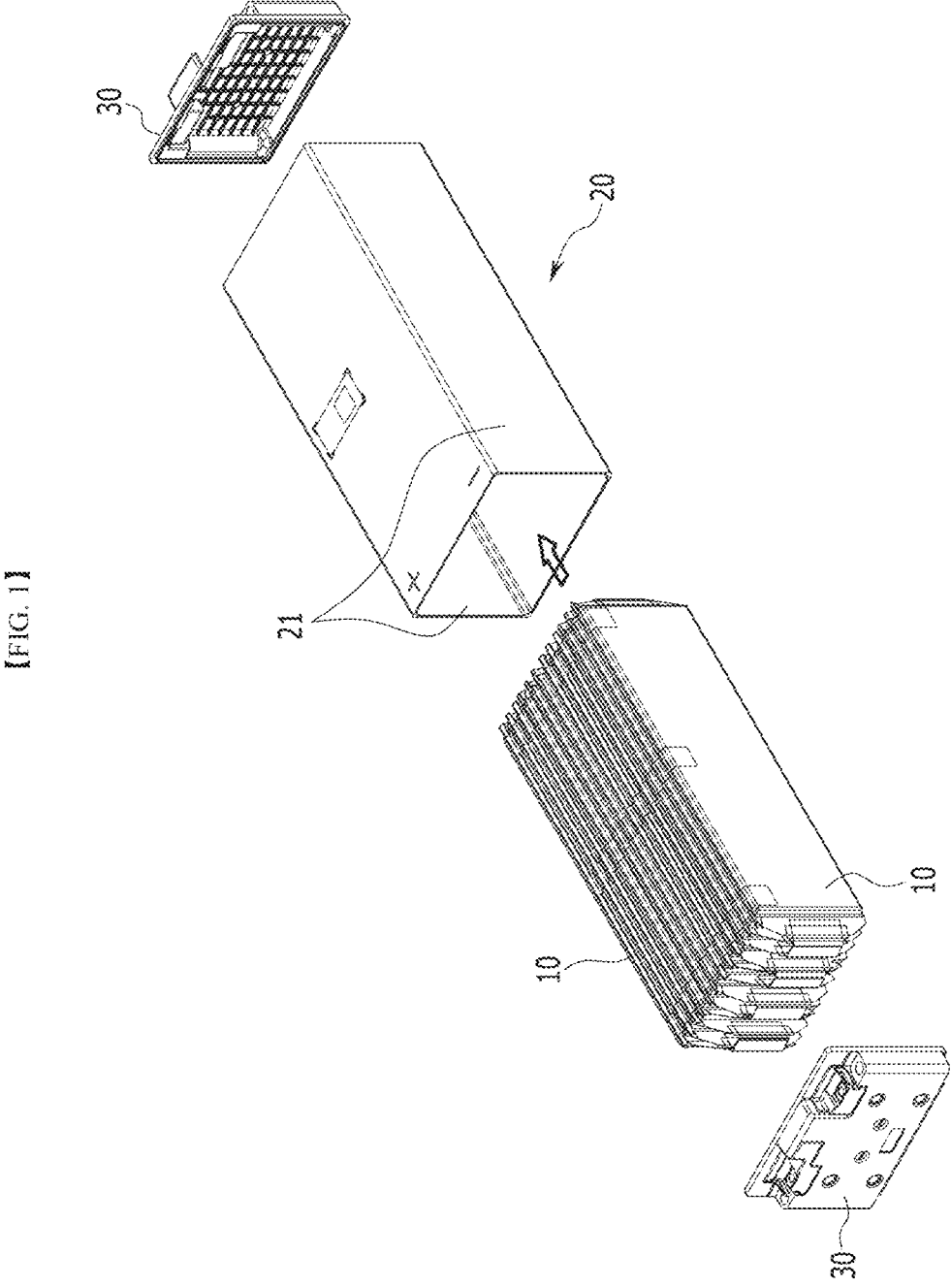

[FIG. 2]
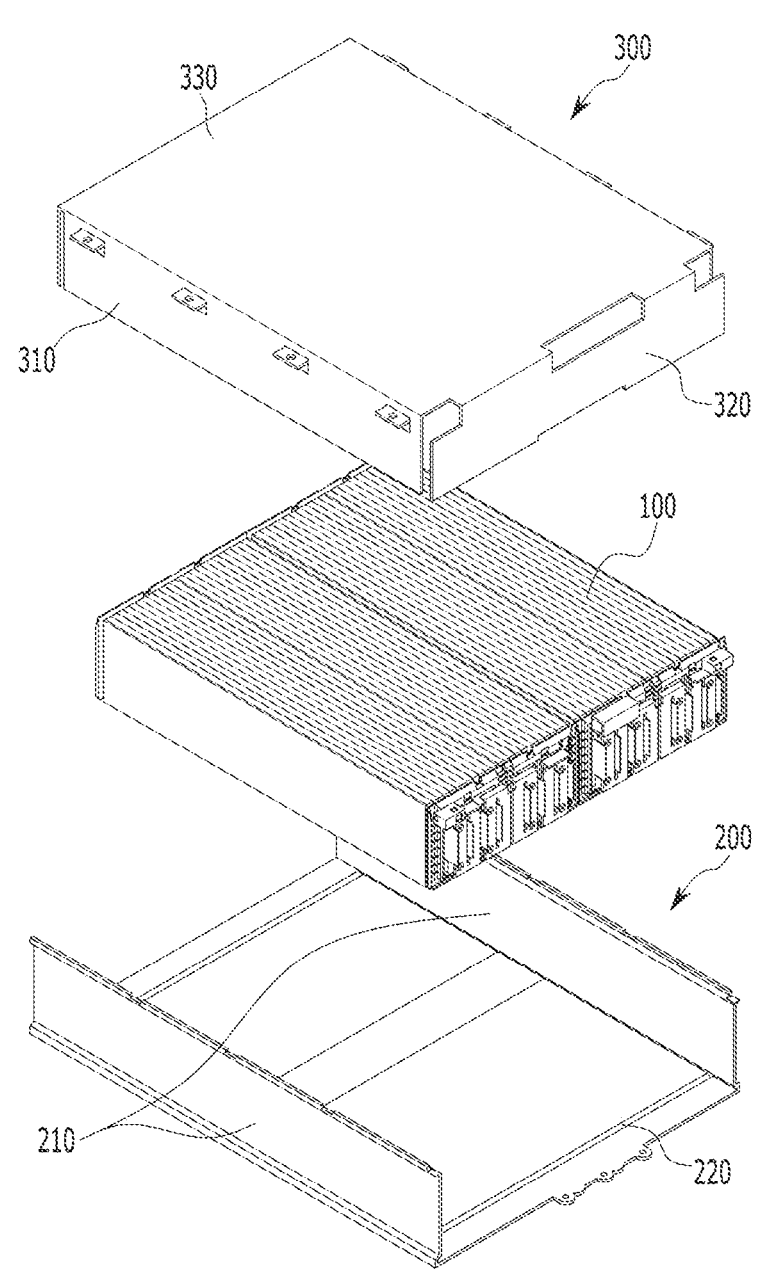

[FIG. 3]
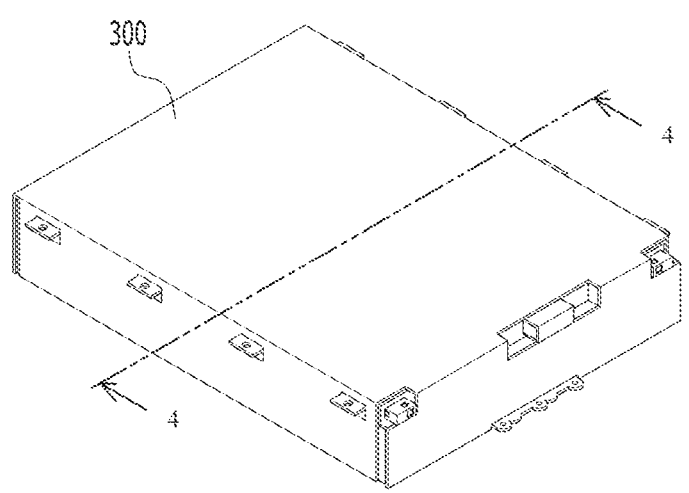
[FIG. 4]
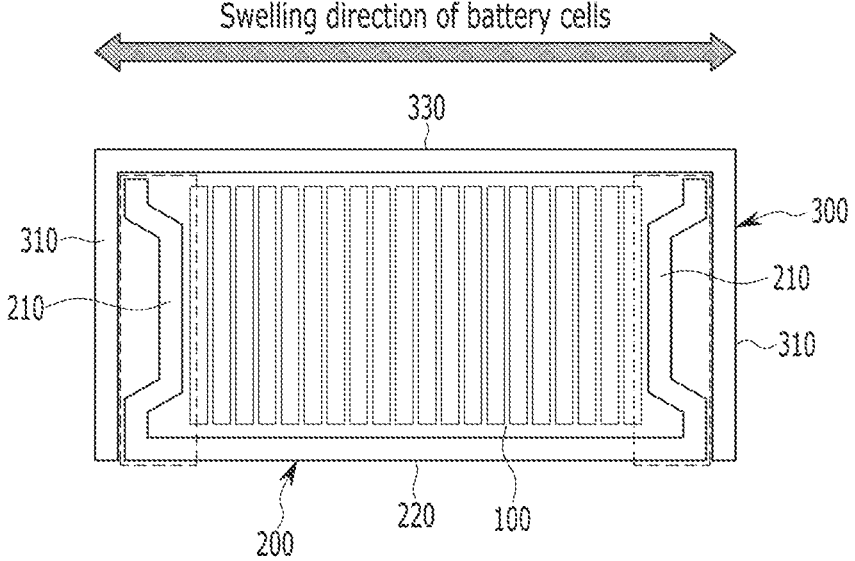

[FIG. 5]
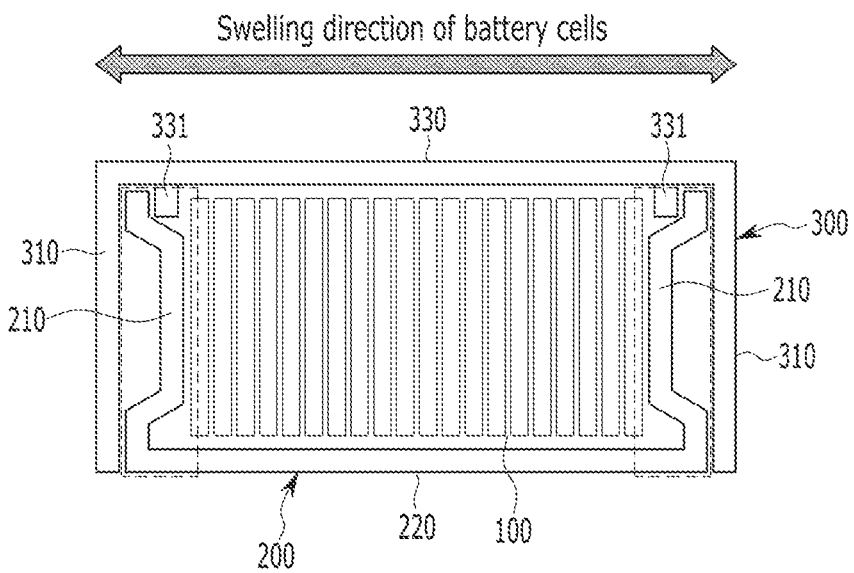

[FIG. 6]
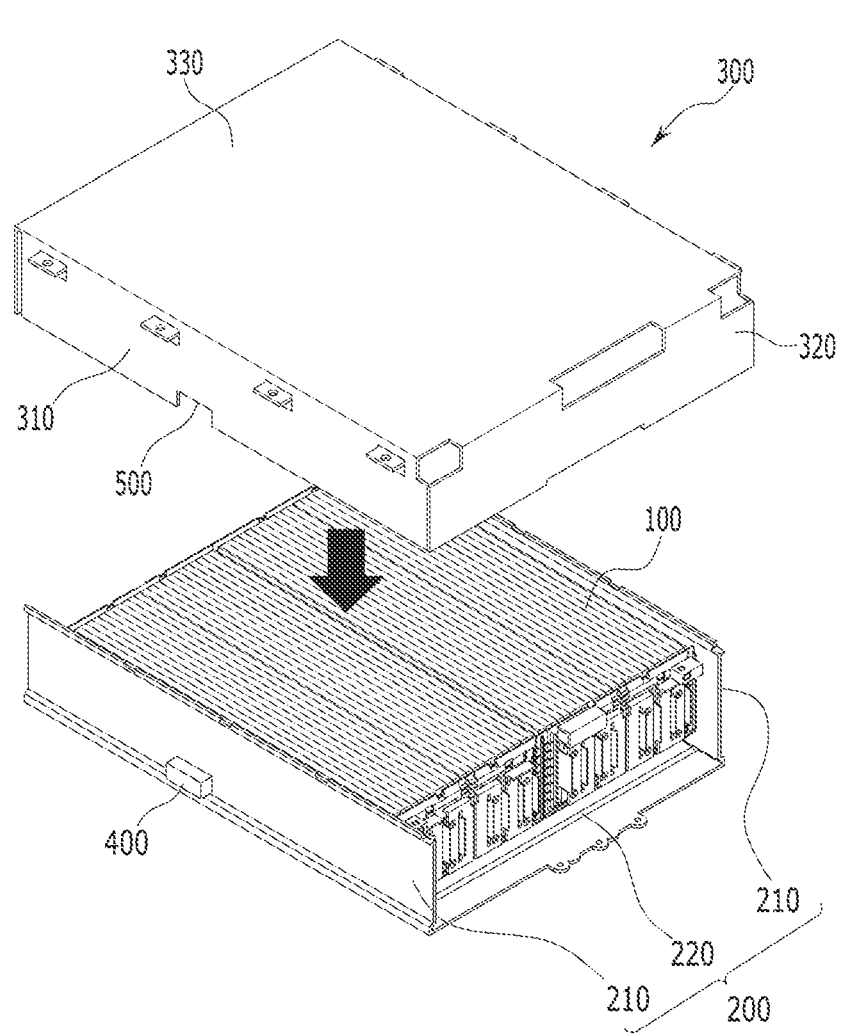

[FIG. 7]
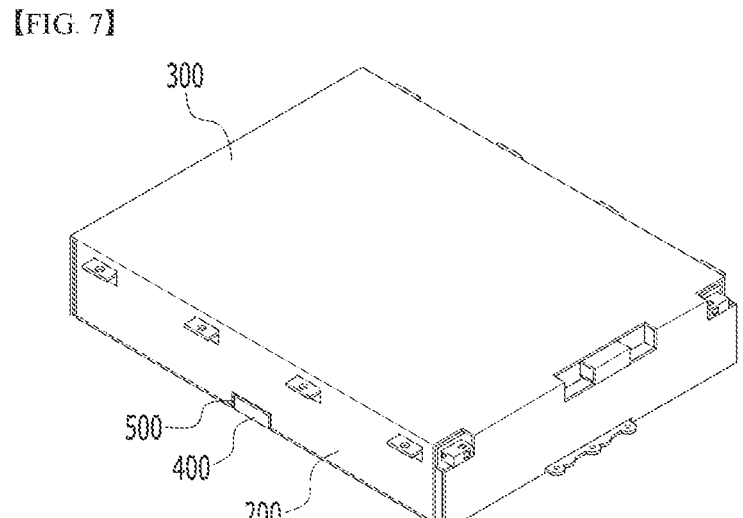

[FIG. 8]

[FIG. 9]
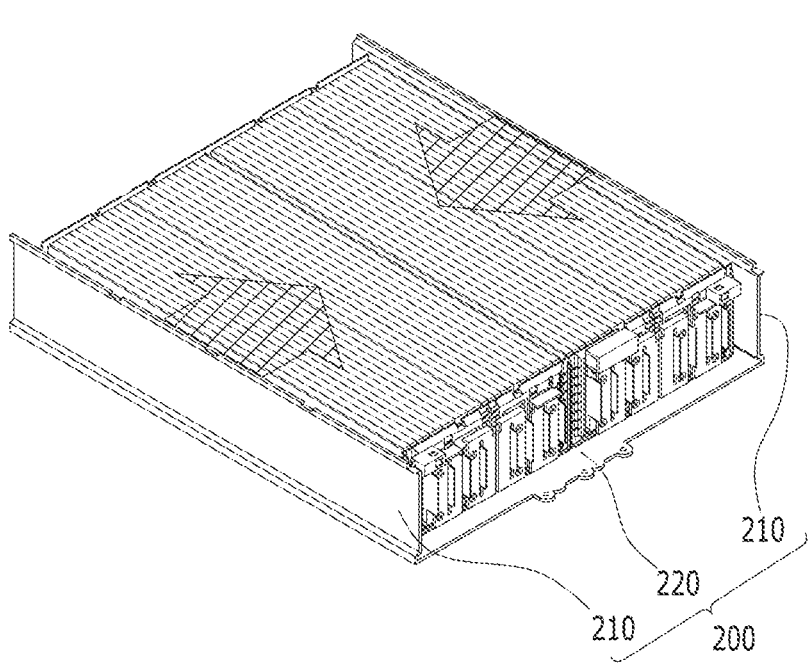

[FIG. 10]
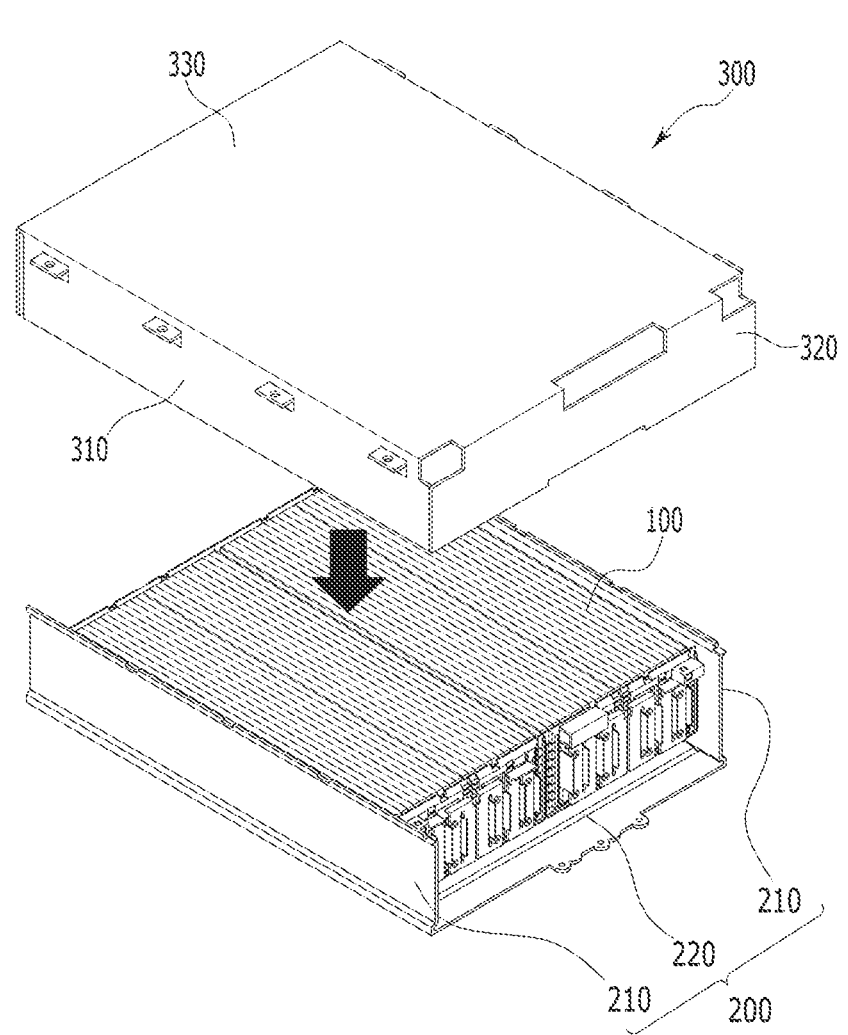

[FIG. 11]
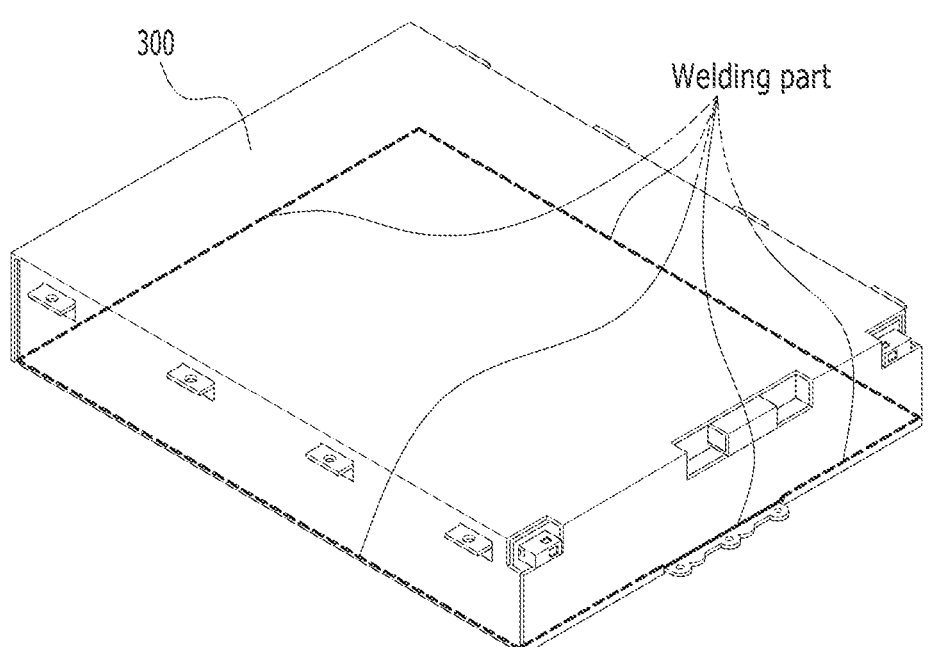

BATTERY MODULE AND METHOD FOR MANUFACTURING THE SAME

CROSS CITATION WITH RELATED APPLICATION(S)

This application claims the benefit of Korean Patent Application No. 10-2020-0028575 filed on Mar. 6, 2020 in the Korean Intellectual Property Office, the disclosure of which is incorporated herein by reference in its entirety.

TECHNICAL FIELD

The present disclosure relates to a battery module and a method for manufacturing the same, and more particularly to a battery module that prevents deformation of a module width, and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of battery cells first, and then configure a battery pack by using at least one of the battery modules and adding other components.

Such a battery module includes a battery cell stack in which a plurality of battery cells are stacked, and a frame for housing the battery cell stack.

FIG. 1 is a view illustrating a conventional battery module including a frame formed of upper, lower, left, and right surfaces.

Referring to FIG. 1, conventionally, the frames for covering the battery cell stack 10 are formed of a frame 20 for covering the upper, down, left and right surfaces of the battery cell stack 10, and end plates 30 for covering the front and rear surfaces of the battery cell stack 10. During charge and discharge of the battery cells, a swelling phenomenon may occur in which the battery cells swell up, and both side surfaces 21 of the frame 20 formed in the stacking direction of the battery cell stack 10 may receive pressure due to swelling from the battery cell stack 10. At this time, there is a problem that only both side surfaces 21 of the frame 20 formed with a single layer must withstand the swelling pressure of the battery cells.

DETAILED DESCRIPTION OF THE INVENTION

Technical Problem

It is an object of the present disclosure to provide a battery module having a frame structure that can withstand the swelling of the battery cell when it occurs.

However, the technical problem to be solved by embodiments of the present disclosure is not limited to the above-described problems, and can be variously expanded within the scope of the technical idea included in the present disclosure.

Technical Solution

In order to achieve the above object, according to one embodiment of the present disclosure, there is provided a battery module comprising: a battery cell stack in which a plurality of battery cells are stacked in a stacking direction, a first frame comprising a lower surface, a left surface and a right surface to cover a lower surface, a left surface and a right surface of the battery cell stack, respectively; and a second frame of which an upper surface, a front surface, rear surface, left surface and a right surface are integrally formed to cover an upper surface, a front surface, and a rear surface of the battery cell stack and the left surface and the right surface of the first frame, wherein the left surface and the right surface of the first frame are formed of an elastic member curved in the stacking direction.

In order to achieve the above object, according to another embodiment of the present disclosure, there is provided a method for manufacturing a battery module, the method comprising: assembling a battery cell stack on a first frame formed of a lower surface, a left surface having elasticity and a right surface having elasticity, making the left surface and the right surface of the first frame narrow in a stacking direction in which the battery cell stack; assembling a second frame, of which an upper surface, a front surface, a rear surface, a left surface and a right surface are integrally formed, so as to cover an upper surface, a front surface and a rear surface of the battery cell stack and the left surface and the right surface of the first frame; and coupling the first frame and the second frame through welding.

The left surface and the right surface of the first frame may be located along the stacking direction.

The elastic member may be formed of a leaf spring.

An elastic member fixing part for fixing an upper end of the elastic member may be formed on one surface of the second frame, and the elastic member fixing part may be between the battery cell stack and the elastic member.

Lower ends of the left surface and the right surface of the first frame and lower ends of the left surface and the right surface of the second frame, and front and rear ends of the lower surface of the first frame and lower ends of the front and rear surfaces of the second frame may be coupled by welding.

A guide may protrude at lower ends of the left surface and the right surface of the first frame, a guide insertion part, into which the guide is inserted, may be formed to be recessed at lower ends of the left surface and the right surface of the second frame corresponding to the guide, and the guide may be inserted into the guide insertion part.

A width of the upper surface of the first frame may be wider than a width of the lower surface of the second frame.

The first frame and the second frame may be formed through a pressing process.

In coupling the first frame and the second frame through welding, lower ends of the left and right surfaces of the first frame and lower ends of the left and right surfaces of the second frame, and front and rear ends of the lower surface of the first frame and lower ends of the front and rear surfaces of the second frame may be welded.

Advantageous Effects

The battery module and its manufacturing method according to an embodiment of the present invention are configured such that a double frame structure is formed in the direction in which swelling occurs, and the frame located inside is formed of an elastic member, thereby providing the effect capable of preventing swelling without a separate additional structure.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view illustrating a battery module including a frame formed of upper, lower, left, and right surfaces:

FIG. 2 is an exploded perspective view illustrating a battery module according to an embodiment of the present disclosure:

FIG. 3 is a view illustrating a state in which the battery module according to an embodiment of the present disclosure is assembled;

FIG. 4 illustrates section 4-4 of FIG. 3 and is a cross-sectional view of the battery module according to an embodiment of the present disclosure;

FIG. 5 illustrates section 4-4 of FIG. 3 and is a view illustrating a battery module according to another embodiment of the present disclosure;

FIG. 6 is a view illustrating a state in which a battery module according to yet another embodiment of the present disclosure is assembled;

FIG. 7 is a view illustrating a state in which the battery module according to yet another embodiment of the present disclosure is assembled:

FIG. 8 is a view illustrating a state in which a battery cell stack is assembled in a first frame in accordance with an embodiment of the present disclosure;

FIG. 9 is a view illustrating a process of narrowing left and right surfaces of the first frame assembled in FIG. 8;

FIG. 10 is a view illustrating a state in which a second frame is assembled in an assembly of FIG. 9; and FIG. 11 is a view illustrating a welding line in a process of welding the first and second frames of FIG. 10.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, movements, parts or combinations thereof, but it should be understood that they do not preclude a possibility of existence or addition of one or more other features, numbers, steps, movements, constitutional elements, parts or combinations thereof.

Hereinafter, a battery module according to an embodiment of the present disclosure will be described with reference to FIGS. 2 to 4.

FIG. 2 is an exploded perspective view illustrating a battery module according to an embodiment of the present disclosure. FIG. 3 is a view illustrating a state in which the battery module according to an embodiment of the present disclosure is assembled. FIG. 4 illustrates section 4-4 of FIG. 3 and is a cross-sectional view of the battery module according to an embodiment of the present disclosure.

Referring to FIGS. 2 to 4, a battery module according to an embodiment of the present disclosure includes a battery cell stack 100 in which a plurality of battery cells are stacked, a first frame 200 formed of a lower surface, and left and right surfaces to cover a lower surface and left and right surfaces of the battery cell stack 100, and a second frame 300 of which an upper surface, and front, rear, left and right surfaces are integrally formed to cover an upper surface and front and rear surfaces of the battery cell stack 100 and the left and right surfaces of the first frame 200. The left and right surfaces 210 of the first frame 200 are formed of an elastic member which is curved in a direction in which the battery cell stack 100 is located.

A battery cell is a secondary battery, which can be formed of a pouch type secondary battery. The battery cells may be formed of a plurality of battery cells, and the plurality of the battery cells can be stacked so as to be electrically connected to each other, thereby forming the battery cell stack 100. The plurality of the battery cells may include an electrode assembly, a cell case, and electrode leads protruded from the electrode assembly.

According to an embodiment of the present disclosure, the battery module includes the first and second frames 200 and 300 for covering the battery cell stack 100. The first frame 200 is formed of first frame-left and right surfaces 210 and a first frame-lower surface 220, and are formed so as to cover the lower surface and the left and right surfaces of the battery cell stack 100.

The second frame 300 is configured such that second frame-left and right surfaces 310, second frame-front and rear surfaces 320, and a second frame-upper surface 330 are integrally formed so as to cover the upper surface and front and rear surfaces of the battery cell stack 100 and the left and right surfaces 210 of the first frame 200.

According to an embodiment of the present disclosure, a width of the second frame-upper surface 330 is larger than a width of the first frame-lower surface 220, so that the second frame-left and right surfaces 310 cover the first frame-left and right surfaces 210.

Conventionally, the frame structure formed so as to correspond to the left and right surfaces of the battery cell stack located along the stacking direction of the battery cell stack is formed of a single frame structure, and thus, it was difficult to prevent deformation of the battery module when swelling occurs.

Thus, according to an embodiment of the present disclosure, a double frame structure composing of the left and right surfaces 210 of the first frame 200 and the left and right surfaces 310 of the second frame 300 located along the stacking direction of the battery cell stack 100 is formed, and a reinforced double frame structure is formed in the stacking direction of the battery cells to which a force due to swelling acts, thereby effectively preventing deformation of the battery module when swelling of battery cells occurs.

Further, conventionally, as the structure for covering the battery cell stack, a structure in which plural components of a U-shaped frame, an upper plate, and two end plates are assembled to cover the battery cell stack, or as a comparative example, a structure in which plural components of a frame formed of upper, lower, left, and right surfaces, and two end plates to cover the battery cell stack, are disclosed, but the conventional structure that couples plural components has the disadvantages in that it is likely to deteriorate the strength of the frame, all of the plural components have to be assembled, and an assembling line become longer during welding or bolting, which makes an assembling process complicated.

Thus, according to an embodiment of the present disclosure, since a battery module structure is formed so as to cover the battery cell stack 100 with only two first and second frames 200 and 300, the frame structure can be integrated and simplified, the end plates can be replaced by the front and rear surfaces 320 of the second frame 300, and the upper plate can be replaced by the upper surface 330 of the second frame 300, thereby reducing the number of the frame components, reducing the number of the assembling processes of the frame components, and remarkably improving poor quality problems that may occur in a complicated assembling process.

Further, according to an embodiment of the present disclosure, the left and right surfaces 210 of the first frame 200 are formed of an elastic member curved in the stacking direction of the battery cells of the battery cell stack 100, and the elastic member is formed in the stacking direction of the battery cell stack, that is, in a part affected by swelling, so that the left and right surfaces 210 of the first frame 200 formed of the elastic member can absorb the swelling occurring from the battery cells. Through this, a width of the module in left and right side directions of the battery module can be maintained, and thus despite an occurrence of a swelling phenomenon, it is possible to prevent a volume of the battery module from being changed and to reinforce the usability of the battery module.

According to an embodiment of the present disclosure, the elastic member 210 may be formed of a leaf spring. Accordingly, when battery cell swelling occurs, as the leaf spring located in a part that received pressure due to the swelling is contracted, the swelling of the battery cells can be absorbed.

According to an embodiment of the present disclosure, the first frame 200 and the second frame 300 may be coupled by welding. At this time, lower ends of the left and right surfaces of the first frame 200 and lower ends of the left and right surfaces of the second frame 300, and front and rear ends of the lower surface of the first frame 200 and lower ends of the front and rear surfaces of the second frame 300 can be coupled by welding.

Thicknesses of frame surfaces of the first frame 200 and the second frame 300 may be identical to each other. The left and right surfaces 210 of the first frame 200 and the left and right surfaces 310 of the second frame 300 may be disposed so as to be perpendicular to the stacking direction of the battery cell stack 100.

FIG. 5 illustrates section 4-4 of FIG. 3 and is a view illustrating a battery module according to another embodiment of the present disclosure.

Referring to FIG. 5, the battery module according to the embodiment of the present disclosure may be configured such that an elastic member fixing part 331 for fixing an upper end of an elastic member may be formed on an upper surface 330 of a second frame 300. According to the embodiment of the disclosure, the elastic member fixing part 331 for fixing the upper end of the elastic member may be formed on the upper surface of the second frame 300, and the elastic member fixing part 331 may be protruded between the battery cell stack 100 and the elastic member from the upper surface 330 of the second frame 300.

As the elastic member fixing part 331 fixes the upper end of the elastic member, the left and right surfaces 210 of the first frame formed of the elastic member can be fixed in second frame 300 to more effectively absorb the swelling of battery cells when it occurs.

FIG. 6 is a view illustrating a state in which a battery module according to yet another embodiment of the present disclosure is assembled. FIG. 7 is a view illustrating a state in which the battery module according to yet another embodiment of the present disclosure is assembled.

Referring to FIGS. 6 and 7, the battery module according to the embodiment of the present disclosure may be configured such that a guide 400 is formed to be protruded at lower ends of the left and right surfaces of the first frame 200, a guide insertion part 500, into which the guide 400 is inserted, is formed to be recessed at lower ends of the left and right surfaces of the second frame 300, and the guide 40 is inserted into the guide insertion part 500.

Therefore, at the time of assembling the second frame 300 to the first frame 200 in which a battery cell stack 100 is assembled, the second frame 300 can be assembled to the first frame 200 in conformity to the guide 400 formed in the first frame 200. An assembly accuracy can be improved by assembling via the guide 400, and the assembly strength can be reinforced by the protruded and formed guide 400.

Figure 8:
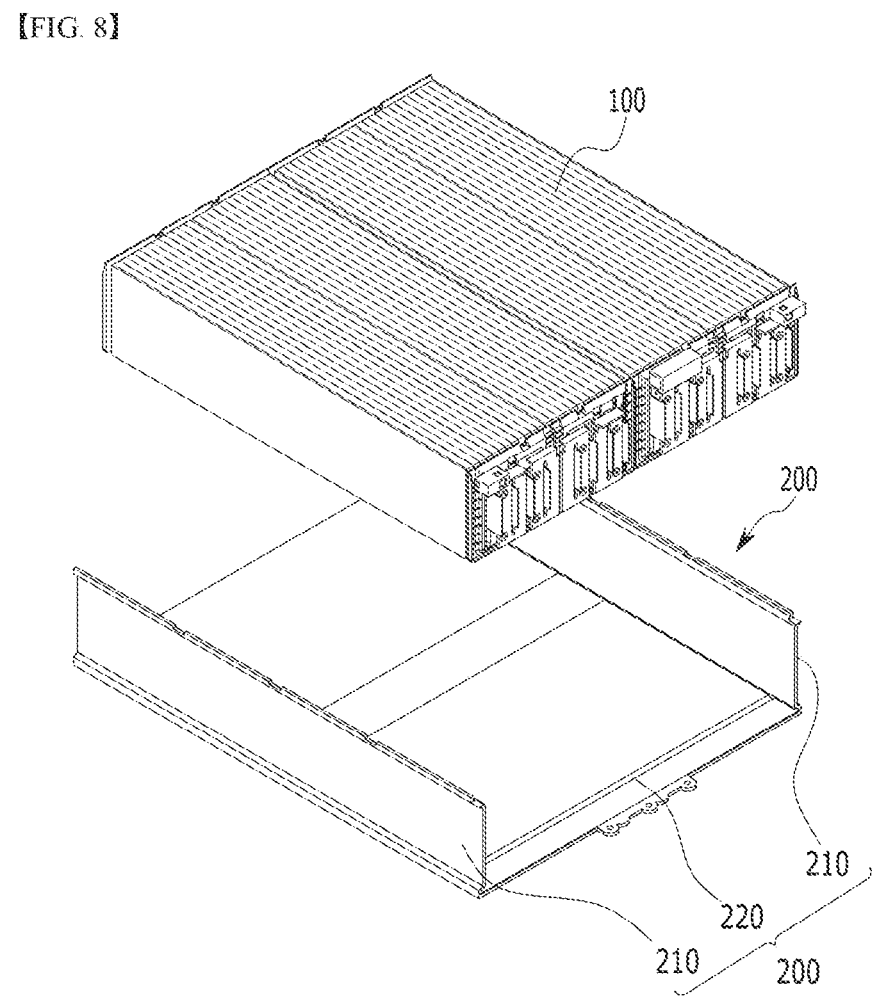

Hereinafter, a method for assembling a battery module according to an embodiment of the present disclosure will be described with reference to FIGS. 8 to 11.

FIG. 8 is a view illustrating a state in which a battery cell stack is assembled in a first frame in accordance with an embodiment of the present disclosure. FIG. 9 is a view illustrating a process of narrowing left and right surfaces of the first frame assembled in FIG. 8. FIG. 10 is a view illustrating a state in which a second frame is assembled in an assembly of FIG. 9. FIG. 11 is a view illustrating a welding line in a process of welding the first and second frames of FIG. 10.

Referring to FIGS. 8 and 11, a method for assembling a battery module according to an embodiment of the present disclosure includes a step of assembling a battery cell stack 100 on a first frame 200 formed of a lower surface and left and right surfaces having elasticity (FIG. 8), a step of making left and right surfaces 210 of the first frame 200 narrow in a direction in which the battery cell stack 100 is located (FIG. 9), a step of assembling a second frame 300, of which an upper surface, and front, rear, left and right surfaces are integrally formed, so as to cover an upper surface and front and rear surfaces of the battery cell stack 100 and the left and right surfaces of the first frame 200, in a state in which the left and right surfaces 210 of the first frame 200 are made narrow (FIG. 10); and a step of coupling the first frame 200 and the second frame 300 through welding (FIG. 11).

According to the present disclosure, the first frame-left and right surfaces 210 are formed of an elastic member, the battery cell stack 100 is assembled on the first frame 200, and then the first frame-left and right surfaces 210 can be widened outwards without being closely attached to the side surfaces of the battery cell stack 100. Because the second frame 300 has to be assembled such that the second frame-left and right surfaces 310 are located in the outer parts of the first frame-left and right surfaces 210, the second frame 300 may be assembled so as to cover the first frame-left and right surfaces 210 in a state in which the first frame-left and right surfaces 210 are made narrow in a direction in which the battery cell stack 100 is located.

According to an embodiment of the present disclosure, the first frame 200 and the second frame 300 may be formed through a pressing process. The first and second frames 200 and 300 may be formed of the same material. Through this, the first and second frames 200 and 300 can be manufactured in a single process when manufacturing the frame components to simplify a manufacturing process and reducing a poor quality.

According to an embodiment of the present disclosure, in a step of coupling the first frame 200 and the second frame 300 through welding, lower ends of the left and right surfaces of the first frame 200 and lower ends of the left and right surfaces of the second frame 300, and front and rear ends of the lower surface of the first frame 200 and lower ends of the front and rear surfaces of the second frame 300 may be welded to each other. The contents of a welding line are illustrated in FIG. 10.

Conventionally, there was a problem that the frame structure has to be assembled through a complicated assembling process in which a battery cell stack is inserted into an interior of a U-shaped frame, an upper plate is assembled on an upper side of the battery cell stack, the upper plate and the U-shaped frame are welded to each other, a first end plate is assembled, the first end plate, the U-shaped frame and the upper plate are welded to each other, a second end plate is assembled, and the second end plate, the U-shaped frame and the upper plate are welded to each other. Further, in a case of the frame formed of upper, lower, left, and right surfaces, there was a problem that the frame structure has to be assembled through a complicated assembling process in which the battery cell stack is inserted into the interior of the frame formed of the upper, lower, left, and right surfaces, the end plates are assembled in the front and rear surfaces of the battery cell stack, and then the end plates and the frame are welded to each other.

However, according to an embodiment of the present disclosure, because the battery module has a structure for covering the battery cell stack 100 with only two frame components of the first and second frames 200 and 300, the battery module frame structure can be formed through a simple assembling process of inserting the battery cell stack 100 into the first frame 200, and making the first frame-left and right surfaces 210 narrow, assembling the second frame 300 to the first frame 200, and welding the first and second frames 200 and 300, whereby a welding process can be simplified as compared with the related art and the manufacturing process can be simplified, thereby reducing a defect rate of products The above-mentioned battery module can be included in the battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery module
200: first frame
210: first frame-left and right surfaces (elastic member)
220: first frame-lower surface
300: second frame
310: second frame-left and right surfaces
320: second frame-front and rear surfaces
330: second frame-upper surface
331: elastic member fixing part
400: guide
500: guide insertion part

The invention claimed is:

1. A battery module comprising:
a battery cell stack in which a plurality of battery cells are stacked in a stacking direction;
a first frame comprising a lower surface, a left surface and a right surface to cover a lower surface, a left surface and a right surface of the battery cell stack, respectively; and
a second frame of which an upper surface, a front surface, rear surface, left surface and a right surface are integrally formed to cover an upper surface, a front surface, and a rear surface of the battery cell stack and the left surface and the right surface of the first frame,
wherein the left surface and the right surface of the first frame each have a bottom edge connected to the lower surface of the first frame and three free edges including a top edge, a first side edge and a second side edge,
wherein the left surface and the right surface of the first frame are formed of an elastic member curved in the stacking direction,
wherein each of the left surface and the right surface of the first frame has a central section, a first section having a first edge integrally connected to the lower surface of the first frame and a second edge connected to a first edge of the central section and a second section connected to a second edge of the central section, the central section extending inwardly relative to the first section and the second section, and
wherein the top edge of the left surface and the top edge of the right surface of the first frame are moveable relative to each other.

2. The battery module according to claim 1, wherein the left surface and the right surface of the first frame are located along the stacking direction.

3. The battery module according to claim 1, wherein the elastic member is a leaf spring.

4. The battery module according to claim 1, wherein an elastic member fixing part for fixing an upper end of the elastic member is formed on one surface of the second frame, and wherein the elastic member fixing part is between the battery cell stack and the elastic member.

5. The battery module according to claim 1, wherein lower ends of the left surface and the right surface of the first frame and lower ends of the left surface and the right surface of the second frame, and front and rear ends of the lower surface of the first frame and lower ends of the front and rear surfaces of the second frame are coupled by welding.

6. The battery module according to claim 1, wherein a guide protrudes at lower ends of the left surface and the right surface of the first frame, wherein a guide insertion part, into which the guide is inserted, is formed to be recessed at lower ends of the left surface and the right surface of the second frame corresponding to the guide, and wherein the guide is inserted into the guide insertion part.

7. The battery module according to claim 1, wherein a width of the upper surface of the second frame is wider than a width of the lower surface of the first frame.

8. A battery pack comprising the battery module according to claim 1.

9. The battery module according to claim 1, wherein the first section, central section and second section of the left surface and the right surface of the first frame are arranged from the lower surface of the first frame to the upper surface of the second frame.

10. The battery module according to claim 1, wherein each of the second sections of the left surface and the right surface of the first frame is parallel to a respective one of the left surface and the right surface of the second frame and has a free end.

11. The battery module according to claim 1, further comprising a pair of elastic member fixing parts for fixing an upper end of the elastic member extending downward from the upper surface of the second frame, and wherein the pair of elastic member fixing parts contact the second section of a respective one of the left surface and the right surface of the first frame to prevent inward movement of the left surface and the right surface of the lower frame.

12. The battery module according to claim 1, wherein the free edges of the left surface and the right surface of the first frame are spaced from the battery cell stack.

13. A method for manufacturing a battery module, the method comprising:

assembling a battery cell stack on a first frame formed of a lower surface, a left surface having elasticity and a right surface having elasticity;

making the left surface and the right surface of the first frame narrow in a stacking direction of the battery cell stack, wherein the left surface and the right surface of the first frame each have a bottom edge connected to the lower surface of the first frame and three free edges including a top edge, a first side edge and a second side edge;

assembling a second frame, of which an upper surface, a front surface, a rear surface, a left surface and a right surface are integrally formed, so as to cover an upper surface, a front surface and a rear surface of the battery cell stack and the left surface and the right surface of the first frame;

coupling the first frame and the second frame through welding; and forming each of the left surface and the right surface of the first frame with a central section, a first section having a first edge integrally connected to the lower surface of the first frame and a second edge connected to a first edge of the central section and a second section connected to a second edge of the central section, the central section extending inwardly relative to the first section and the second section, wherein the top edge of the left surface and the top edge of the right surface of the first frame are moveable relative to each other.

14. The method according to claim 13, wherein the first frame and the second frame are formed through a pressing process.

15. The method according to claim 13, wherein in coupling the first frame and the second frame through welding, lower ends of the left and right surfaces of the first frame and lower ends of the left and right surfaces of the second frame, and front and rear ends of the lower surface of the first frame and lower ends of the front and rear surfaces of the second frame are welded.

* * * * *